United States Patent [19]

Conroy

[11] Patent Number: 5,041,333
[45] Date of Patent: Aug. 20, 1991

[54] GYPSUM BOARD COMPRISING A MINERAL CASE

[75] Inventor: Alan P. Conroy, St. Petersburg, Fla.

[73] Assignee: The Celotex Corporation, Tampa, Fla.

[21] Appl. No.: 584,676

[22] Filed: Sep. 19, 1990

Related U.S. Application Data

[62] Division of Ser. No. 315,061, Feb. 24, 1989, Pat. No. 4,965,031.

[51] Int. Cl.$^5$ .............................................. B32B 13/00
[52] U.S. Cl. .................................. 428/312.4; 106/100; 106/110; 106/111; 428/316.6; 428/537.7; 428/703
[58] Field of Search ...................... 106/100, 110, 111; 428/312.2, 312.4, 316.6, 537.7, 703

[56] References Cited

U.S. PATENT DOCUMENTS

| | | | |
|---|---|---|---|
| 2,341,426 | 2/1944 | Dailey | 106/110 |
| 3,189,511 | 6/1965 | White | 161/162 |
| 3,305,375 | 2/1967 | Jakacki | 106/109 |
| 3,437,330 | 4/1969 | Worner | 263/53 |
| 3,579,300 | 5/1971 | Bloom et al. | 23/122 |
| 3,592,670 | 7/1971 | Kossuth et al. | 106/110 |
| 3,773,533 | 11/1973 | Omoto et al. | 106/110 |
| 3,977,890 | 8/1976 | Jaunarajs et al. | 106/109 |
| 4,029,512 | 6/1977 | Jaunarajs et al. | 106/109 |
| 4,201,595 | 5/1980 | O'Neill | 106/109 |
| 4,645,548 | 2/1987 | Take et al. | 156/39 |

*Primary Examiner*—William J. Van Balen
*Attorney, Agent, or Firm*—Charles W. Vanecek

[57] ABSTRACT

A continuous process for the production of gypsum board of variable yet predictable density, wherein a fibrous form of stucco produced from gypsum crystals or fibers is combined with standard calcined gypsum and formed into the board. The density of the resultant board varies inversely with the content of fibrous stucco. The process yields lightweight board suitable as standard wallboards and inorganic insulating boards.

4 Claims, 2 Drawing Sheets

FIG. I

GYPSUM BOARD COMPRISING A MINERAL CASE

This is a division of application Ser. No. 315,061, filed Feb. 24, 1989, now U.S. Pat. No. 4,965,031.

BACKGROUND OF THE INVENTION

1. Field of the Invention

This invention relates to gypsum board and is particularly directed to the production of gypsum board of variable yet predictable density by a continuous process in which fibrous stucco is incorporated in the board.

2. Description of the Prior Art

In the production of gypsum board products, gypsum stucco, which is also referred to as calcined gypsum and which is calcium sulfate hemihydrate ($CaSO_4 \cdot 1/2H_2O$), and other additives are admixed with water to make a slurry which is then formed into the desired shape, allowed to set and dried. The standard calcined gypsum or gypsum stucco conventionally used in producing gypsum boards is prepared according to the standard prior art process in a kettle, flash or rotary calciner at normal atmospheric pressures. The setting is a hydration reaction converting the stucco to set gypsum which is calcium sulfate dihydrate ($CaSO_4 \cdot 2H_2O$). In conventional manufacturing, the boards produced have densities within a fairly narrow range of from about 1650 lb/MSF to 1900 lb/MSF. It would be highly desirable if a way could be found to produce an acceptable board product having a variable yet predictable density. A lightweight yet strong board would be especially useful.

OBJECTS OF THE INVENTION

It is therefore an object of the present invention to provide a gypsum-based product of good quality with a reduced amount of water per board foot and a variable yet predictable density.

It is another object of this invention to provide a continuous method of producing a gypsum-based product, which can be used to produce the product with a minimum of drying time and cost.

It is a further object of this invention to provide gypsum-based compositions which can yield gypsum boards having variable and predictable densities.

It is a still further object of this invention to provide gypsum boards with a reduced amount of water per board foot and a reduced density but still with the strength and other physical properties needed for commercial applications.

Other objects and advantages of the present invention will become apparent to those skilled in the art when the instant disclosure is read in conjunction with the accompanying drawings.

SUMMARY OF THE INVENTION

The above objects have been achieved by the process of the present invention, wherein a fibrous form of stucco is incorporated into a gypsum board-forming composition to provide for the production of gypsum boards with varying and predictable densities and to reduce the water demand during board formation. Production of the fibrous stucco can be accomplished by subjecting an aqueous slurry of ordinary gypsum (calcium sulfate dihydrate) to heat and pressure sufficient to bring about substantial conversion of the gypsum into fibrous stucco (fibrous calcium sulfate hemihydrate).

The conversion into fibers is suitably effected by continuously passing a slurry of gypsum and water (e.g., about 10:1 to 1:2 water:gypsum wt ratio) through a conventional pressure vessel (such as an autoclave), pressurized with steam and water and at a temperature between 110 and 180° C. Alternately, a stirred batch autoclave can be used to produce the fibrous stucco. The residence time is such that the particles of gypsum are substantially converted to fibrous alpha hemihydrate. In another advantageous embodiment of the invention, gypsum fibers are converted to fibrous stucco by continuously passing a slurry of the fibrous gypsum and water through a conventional pressure vessel as above. In yet another advantageous embodiment, gypsum fibers are converted to fibrous stucco by standard calcination equipment before blending with standard stucco and forming into the gypsum board of the invention.

After exiting the autoclave or other converter, the wet calcined material is advantageously diluted to provide a given mass of material in a water stream which is then fed to a mixer for combination with standard calcined gypsum. The terms "standard calcined gypsum" or "standard stucco" as used in this specification and claims means the ordinary (non-fibrous) calcined gypsum which can be prepared according to the usual prior art process in a kettle calciner or rotary calciner at normal atmospheric pressures, as described, for example in U.S. Pat. No. 2,341,426. In another embodiment, the fibrous stucco/water slurry can be dewatered to increase its fiber content and then continuously blended with the standard calcined stucco. The mixture resulting from either method is allowed to set and dry to form a gypsum product of the present invention. The inclusion of the stucco fibers lowers the amount of standard stucco employed and concomitantly lowers the water required during board formation and hence the drying time and cost. Also, by incorporating the fibrous stucco at varying levels into the standard stucco, gypsum boards with a broad range of densities can be obtained. The greater the replacement of standard stucco by stucco fibers the lower is the density of the resultant product. Any decrease in flexural and compressive strengths which accompanies the decrease in density is compensated for by the use of facers, fillers and reinforcers during the board formation.

DESCRIPTION OF THE DRAWINGS

The invention will now be described with reference to the accompanying drawings in which.

DETAILED DESCRIPTION OF THE INVENTION

The process of the invention is practiced by converting gypsum, calcium sulphate, $CaSO_4 \cdot 2H_2O$, by either a continuous or batch autoclave or other suitable calcining device to stucco fibers for admixture with standard stucco and formation into gypsum boards. The standard stucco feed material may be any product of conventional batch or continuous calcination from any gypsum source, such as natural rock or that derived from chemical processes (e.g., gypsum crystals or fibers) including blends of natural rock gypsum and chemical process gypsum. The gypsum source is advantageously ground before calcination. For use in the gypsum board manufacture of the present invention, it is particularly preferred that the standard stucco be continuously produced and have a dispersed consistency of about 60 to 100 cc.

The starting material for the fibrous stucco may likewise be derived from any natural or chemical source, and may, for example, be in the form of finely ground landplaster or gypsum fibers. Gypsum fibers can be converted to fibrous stucco by calcination in a kettle or rotary calciner at normal atmospheric pressure and a temperature in the range of from about 120° to 190° C. The calcination is suitably conducted for about 1 to 3 hours. The calcination can also be accomplished by autoclaving an aqueous slurry of the gypsum fibers, as detailed hereinafter.

Figure 1:
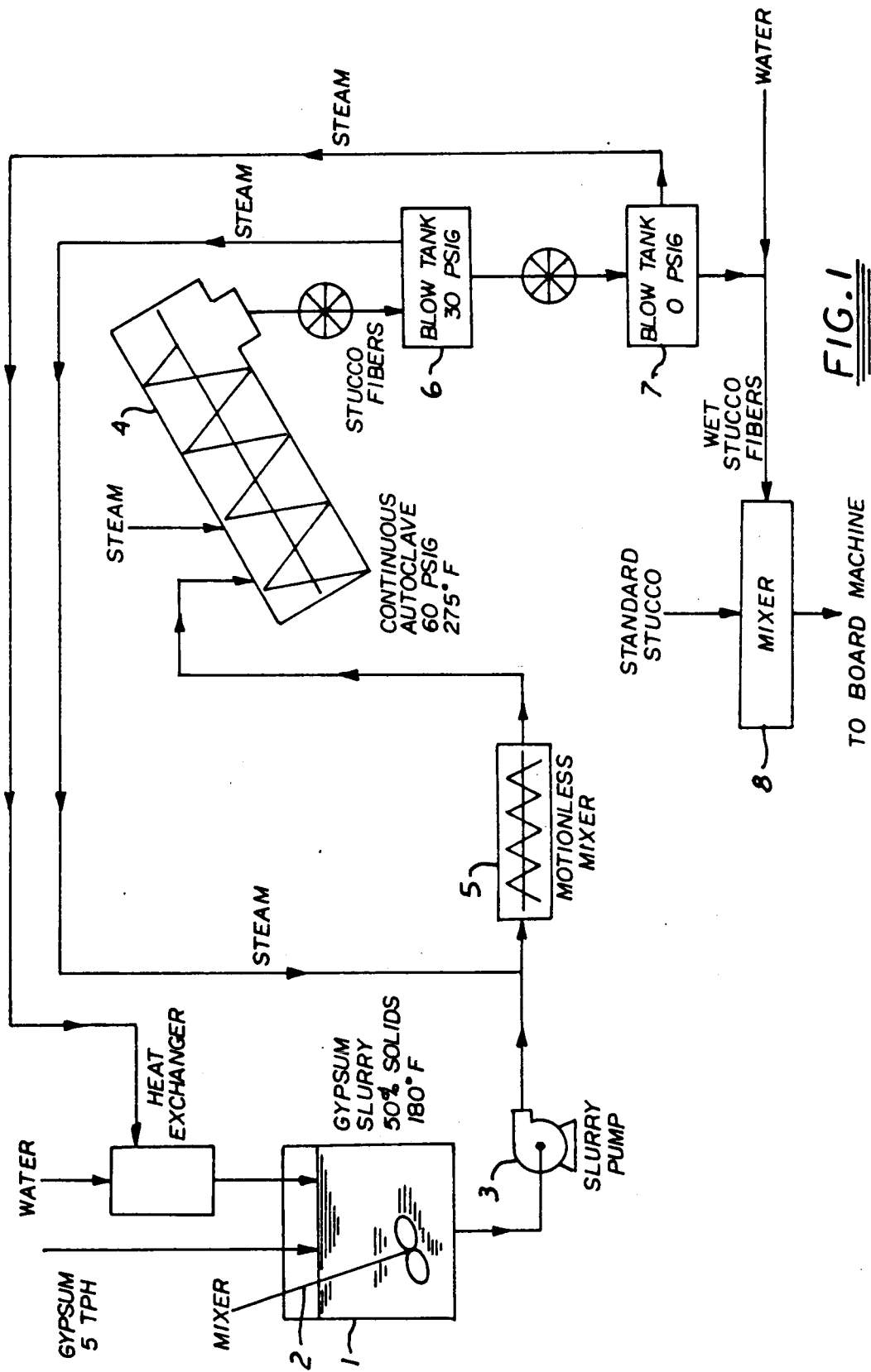
FIG. 1 is a schematic view to illustrate the production of gypsum board, with use of a continuous autoclave for the conversion of gypsum into fibrous stucco.

Referring now more particularly to FIG. 1 for the continuous production in an autoclave of the fibrous stucco of the present invention, the gypsum is continuously fed into slurry tank 1 where the material is kept in an aqueous suspension by a suitable mixer 2. Tank 1 is preferably provided with a heating means. Prior to dispersion in tank 1, the gypsum used may be ground or otherwise comminuted to a fineness of at least about 80% through a 100 mesh screen. Preferably, at least about 90% will go through a 100 mesh screen. Grinding may be avoided if gypsum fibers are used. The suspension may also contain a small amount of a crystal habit modifier which is suitable for the formation of fibrous alpha-hemihydrate, such as disclosed in U.S. Pat. No. 4,029,512.

The slurry, which passes out of tank 1 with about 10 to 70% solids and at a preferred temperature of 70° to 90° C, is continuously fed via a suitable slurry pump 3 to an autoclave 4. Steam may be blown into the conduit transferring the gypsum slurry to the autoclave and further mixing of the slurry is accomplished in mixing device 5. Reactor 4 is provided with means for stirring or otherwise agitating the slurry (e.g., steam injection or lifting plates to minimize agglomeration and speed the reaction. This agitation may be continuous or intermittent throughout the reaction period. The reactor is also provided with means for continuously passing the slurry therethrough (e.g., a screw auger). The water:-gypsum ratio of the slurry in autoclave 4 is preferably at least about 10 to 0.33:1, and, more preferably, at least about 1.5 to 0.33:1. At too great concentrations of gypsum, the slurry has been found to be too thick to produce a uniform degree of formation of the fibrous hemihydrate.

Saturated steam is supplied to autoclave 4 for calcination of the gypsum. The temperature within the autoclave during the reaction period is advantageously greater than about 110° C., and preferably in the range between about 110° C. and 190° C., and more preferably, in the range between about 120° C. and 160° C. Since this temperature represents the temperature of saturated steam, there will be associated the pressure of the saturated steam at the given temperature. Consequently, the attendant steam pressure will be approximately 20 to 200 psig, preferably about 50 to 60 psig.

Reaction time will be in the range of about 0.1 to 3.0, preferably 0.1 to 0.25, hours. Reaction times will be inversely related to the temperature in most cases, with longer reaction times necessary for complete conversion to the fibrous hemihydrate at the lower reaction temperatures. The reaction is advantageously conducted for a period of time sufficient for conversion of at least 25%, preferably $\geq 75\%$, and more preferably $\geq 95\%$, percent by weight of the gypsum to fibrous calcium sulfate hemihydrate. Even when there is less than 100% conversion to fibrous stucco, the calcined product still contains another fibrous material, gypsum fibers, which contributes to the product's usefulness in various applications, e.g., as a filler/ reinforcer.

Following completion of the formation of the fibrous hemihydrate, the fiber-containing slurry is continuously transferred into one or more blow tanks 6 and 7 for pressure reduction. The heat from the steam discharge is recovered upstream during the continuous process. The slurry exiting from blow tank 7 is advantageously diluted with water for further utilization. In another embodiment, the slurry may be dewatered by a filtration device or other suitable means of dewatering material in slurries so as to increase the fiber content to whatever level is desired in the subsequent board manufacturing. The slowness to set of the fibrous hemihydrate can beneficially extend the time for working with this material.

The fibrous stucco and water associated therewith are continuously blended with standard stucco in mixer 8. Any additional water added to the mixture helps to impart to the slurry an appropriate consistency for production of the gypsum boards of the invention. Alternatively, an aqueous slurry may be prepared from a dry blend of the fibrous and non-fibrous calcium sulfate hemihydrates. The calcined gypsum of the slurry or dry blend advantageously comprises from about 1 to 100%, preferably 1 to 20%, and more preferably 1 to 10%, by weight of the fibrous stucco and from about 99 to 0%, preferably 80 to 99%, and more preferably 90 to 99%, by weight of standard stucco. The remainder of the board ingredients can be the other conventional materials used in gypsum board manufacturing. Other materials which may be added to the slurry formed in mixer 8 include: bond protecting agents, such as starch and dextrin; fibers/reinforcing agents, such as paper and glass fibers; fillers, such as vermiculite, perlite, clay, and limestone; water-repellent agents, such as asphalt, waxes, and silicones; dispersing/ wetting agents, such as lignins and organic sulfonates; hardeners/accelerators, such as finely-ground gypsum, potash, and boric acid; retarders, such as chelating agents; and foaming agents, such as soaps. The slurry is continuously converted to gypsum board by a conventional gypsum board making machine.

In the formation of the gypsum board, the fibrous stucco-containing slurry is continuously deposited on a facing sheet (e.g., paper cover sheet). A second facing sheet (e.g. paper cover sheet) may be applied thereover and the board is passed under a roll or rolls to determine the thickness. The continuous strip thus formed is conveyed on a belt until the calcined gypsum has set, and the strip is thereafter cut to form boards of desired length, which boards are conveyed through a drier to remove excess moisture.

The density of the resultant paper covered gypsum board varies as the percentage of fibrous hemihydrate in the board is varied from about <1 to 100%. The higher the content of fibrous stucco, the lower will be the density. Incorporation of the stucco fibers into conventional gypsum formulations makes possible a wide range of densities, such as from about 1200 to 1650 lbs/thousand square feet (MSF) (31 to 43 pcf), versus a typical density of 1750 lbs/MSF. A further advantage of the invention is that low density boards can be produced without resorting to additional foaming agents, lightweight fillers and the like.

As noted above, the aqueous calcined gypsum slurry may contain the conventional additives for manufacturing gypsum board, such as accelerators, bond protecting agents, fillers and fibrous reinforcements, and consistency reducers. The paper facers, fillers and reinforcers contribute to the overall strength of the gypsum board and compensate for any decrease in strength which accompanies the decrease in density brought about by incorporation of fibrous stucco. Since there is also a beneficial reduction in the board's k-factor, which is a measure of its thermal conductivity, as the density decreases, the inventive gypsum board constitutes a lightweight, nonflammable, inorganic product for insulating applications.

The gypsum board of the invention suitably comprises a mineral core having two major, substantially parallel surfaces and a facing material on at least one of the major surfaces of the core, the core being the dried rehydrated product of the following formulation:

|  | RANGE (WT. %) | |
| --- | --- | --- |
|  | TYPICAL | PREFERRED |
| Standard Calcined Gypsum | 50-99 | 90-99 |
| Fibrous Calcium Sulfate Hemihydrate | 1-50 | 1-10 |
| Bond Protecting Agent | 0-5 | 0-5 |
| Fibrous Reinforcer | 0-10 | 0-10 |
| Accelerator | 0-2 | 0-2 |
| Foaming Agent | 0-.5 | 0-.5 |

A typical formulation comprising the core of a board of the invention is as follows:

|  | PARTS BY WEIGHT |
| --- | --- |
| Standard Stucco | 1000-1600 |
| Stucco Fiber | 100-160 |
| Paper Fiber | 3-12 |
| Starch | 5-15 |
| Dispersing Agent | 0-8 |
| Accelerator | 0-15 |
| Retarder | 0-2 |
| Foaming Agent | 0.1-2 |

The invention also encompasses a lightweight gypsum product comprising the dried rehydrated product of the following formulation:

|  | WEIGHT PERCENT |
| --- | --- |
| Standard Calcined Gypsum | 1-50 |
| Fibrous Calcium Sulfate Hemihydrate | 99-50 |
| Fibrous Reinforcer | 0-10 |
| Paper Fiber | 0-2 |
| Fillers | 0-15 |
| Bond Protecting Agent | 0-3 |
| Accelerator | 0-2 |

The invention will now be further described by reference to the following examples. All parts and percentages are by weight unless otherwise indicated.

EXAMPLE 1

Figure 2:
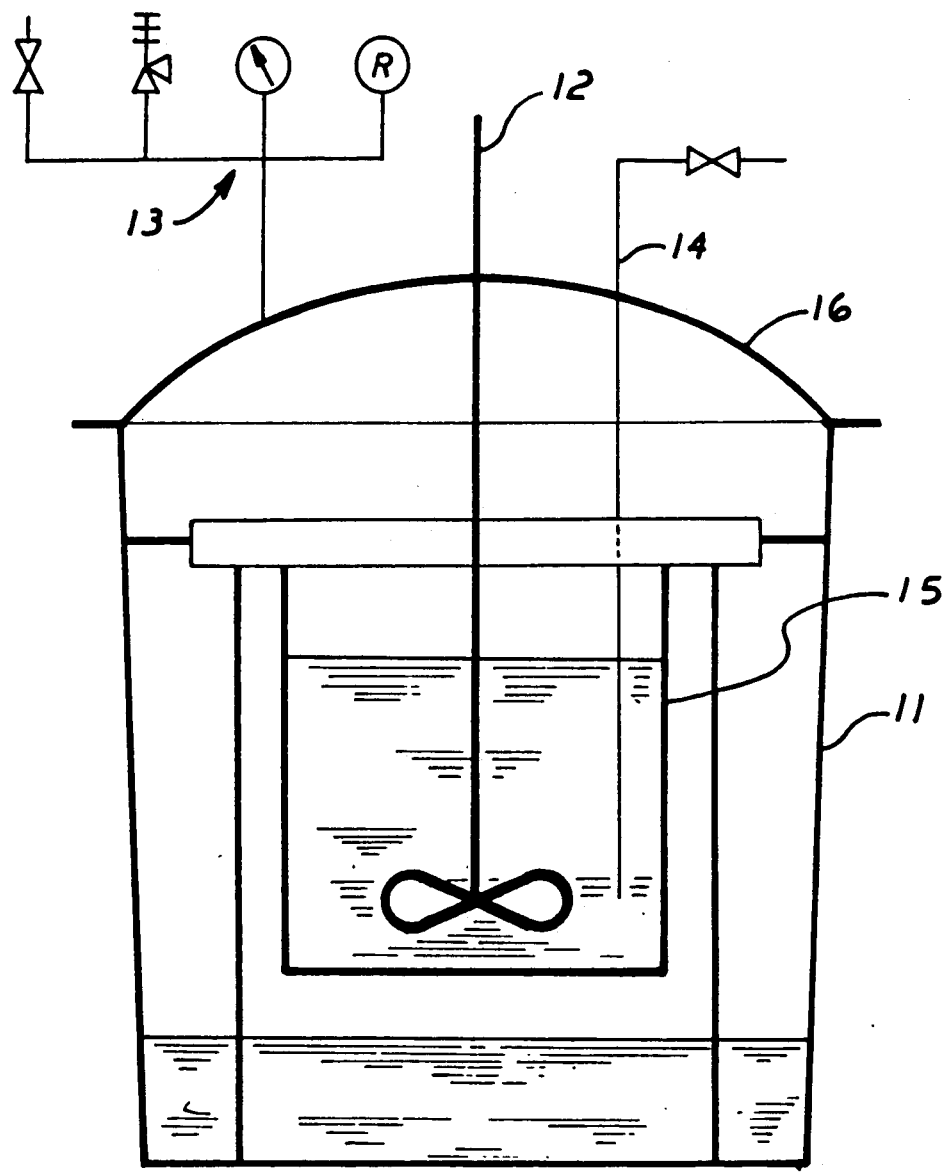
FIG. 2 is a vertical sectional view of the autoclave used in the calcinations described in Examples 1 and 3 below.

This example illustrates, with reference to FIG. 2 of the drawings, the conversion of standard ground land plaster to fibrous stucco (alpha calcium sulfate hemihydrate) in accordance with the present invention.

A. PRODUCTION OF FIBROUS STUCCO

The gypsum used was ground so that >90% went through a 100 mesh screen, and had a purity of 90.4% and contained 0.0% free water. Each calcination of this gypsum summarized in Table 1 below was conducted in a 21-quart autoclave 11, fitted with a stirrer 12, pressure regulating equipment 13, and sampling line 14. The bottom of the autoclave was charged with 2000-3000 cc water. The sample cup 15 was charged with 1000 cc water. The lid 16 was put on the apparatus but all valves were left open and the seal was not made by the lid. The autoclave was heated until the water was boiling vigorously. At this point, the lid 16 was removed and the land plaster was added to the water in the sample cup 15. The apparatus lid 16 was then sealed, all valves were closed and the stirrer 12 was activated. The autoclave 11 was brought to the desired operating pressure and the reaction time was measured from this point on.

In sampling from the dilute suspensions of gypsum and water employed (1:6-1:10 wt ratio), the sampling line 14, which extended to the bottom of the sample cup 15, was used to extract an aliquot using the internal pressure to push out the sample. The small withdrawn aliquots were quickly filtered with suction and washed with acetone. The sample was then dried in an oven at 50° C. for a minimum of two hours.

In the case of the more concentrated suspensions, where the material did not flow easily through the sampling line 14, the stirrer 12 was stopped and removed from the shaft. The autoclave 11 was quickly quenched by cold water to atmospheric pressure. At atmospheric pressure, the vessel was opened and a small aliquot was withdrawn, filtered, washed and dried as above.

The calcination pressure were varied between 5 and 16 psig and the times were from 1-3 hours. Citing a pressure for these calcinations defines a reaction temperature and vice-versa. Thus, for example, the boiling water temperatures correspond to the pressures as follows:

| 5 psig = | 109° C. |
| --- | --- |
| 10 psig = | 116° C. |
| 15 psig = | 121° C. |

The percent stucco formed was determined by placing some of the reaction product dried at 50° C. into an oven at 180° C. and allowing all chemically bound water to be driven off.

From the purity of the landplaster and the weight loss of the sample after drying at 180° C., the % stucco formed was determined.

Samples run using this technique and thermogravimetric analysis simultaneously were shown to give the same results.

B. RESULTS

The data of Table 1 shows that, on the whole, at equivalent reaction conditions (pressure, time and temperature), diluted suspensions of the gypsum landplaster formed the fibrous α-hemihydrate in greater yield than more concentrated suspensions.

Based on the Table 1 data, summaries of the % stucco formed at constant pressures and times are compiled in the following Tables 2 and 3, respectively. A pressure of at least 12.5-13 psig was required to produce the hemihydrate in >90% yields within the maximum 3- hour reaction time of the production runs. The minimum time needed to convert >90% gypsum to hemihydrate was 1 hour for any pressure up to the 16 psig maximum of the runs. In all cases of high hemihydrate yields (>95%), the resulting product was fibrous in nature with a large increase in the bulk volume of the solid mass formed. The hemihydrates produced in >95% yields were allowed to set to evaluate the nature of the stucco. The time to full set was >>1 hour for many of the runs, the slow rehydration rate characteristic of the alpha form of stucco.

TABLE 1

PERCENT STUCCO VS CONDITIONS

| RUN NO. | WATER/ GYPSUM RATIO | TIME (HR) | PRESSURE (PSIG) | STUCCO PRODUCED (%) | RUN NO. | WATER/ GYPSUM RATIO | TIME (HR) | PRESSURE (PSIG) | STUCCO PRODUCED (%) |
|---|---|---|---|---|---|---|---|---|---|
| 1. | 10.0 | 0.1 | 10.0 | 0.9 | 29. | 0.7 | 1.5 | 15.0 | 33.0 |
| 2. | 10.0 | 0.3 | 16.0 | 19.0 | 30. | 3.8 | 1.5 | 16.0 | 100.0 |
| 3. | 10.0 | 0.5 | 16.0 | 7.5 | 31. | 5.0 | 1.5 | 16.0 | 100.0 |
| 4. | 3.0 | 0.8 | 12.0 | 65.0 | 32. | 6.0 | 1.5 | 16.0 | 25.0 |
| 5. | 10.0 | 1.0 | 5.0 | 0.0 | 33. | 6.6 | 1.5 | 16.0 | 82.0 |
| 6. | 10.0 | 1.0 | 5.0 | 2.8 | 34. | 10.0 | 1.5 | 16.0 | 100.0 |
| 7. | 10.0 | 1.0 | 10.0 | 9.6 | 35. | 6.0 | 1.5 | 16.0 | 23.0 |
| 8. | 10.0 | 1.0 | 10.0 | 5.2 | 36. | 4.6 | 1.5 | 16.0 | 31.0 |
| 9. | 10.0 | 1.0 | 10.0 | 12.6 | 37. | 10.0 | 2.0 | 5.0 | 0.9 |
| 10. | 10.0 | 1.0 | 11.5 | 1.0 | 38. | — | 2.0 | 5.0 | 0.0 |
| 11. | 3.0 | 1.0 | 12.0 | 78.6 | 39. | — | 2.0 | 5.0 | 0.0 |
| 12. | 10.0 | 1.0 | 12.0 | 9.6 | 40. | 10.0 | 2.0 | 10.0 | 19.0 |
| 13. | 10.0 | 1.0 | 13.0 | 4.3 | 41. | 10.0 | 2.0 | 10.0 | 23.6 |
| 14. | 10.0 | 1.0 | 13.0 | 4.3 | 42. | 10.0 | 2.0 | 11.5 | 16.3 |
| 15. | — | 1.0 | 15.0 | 25.0 | 43. | 10.0 | 2.0 | 13.0 | 80.9 |
| 16. | 10.0 | 1.0 | 16.0 | 98.9 | 44. | 6.5 | 2.0 | 14.0 | 85.1 |
| 17. | 10.0 | 1.0 | 16.0 | 100.0 | 45. | 9.0 | 2.0 | 16.0 | 96.0 |
| 18. | 3.0 | 1.0 | 16.0 | 82.8 | 46. | 10.0 | 2.0 | 16.0 | 100.0 |
| 19. | 10.0 | 1.0 | 16.0 | 98.9 | 47. | — | 2.0 | 16.0 | 86.0 |
| 20. | 10.0 | 1.1 | 5.0 | 3.6 | 48. | — | 2.0 | 16.0 | 33.0 |
| 21. | 10.0 | 1.5 | 10.0 | 7.0 | 49. | — | 3.0 | 5.0 | 10.3 |
| 22. | 10.0 | 1.5 | 10.0 | 19.0 | 50. | 10.0 | 3.0 | 5.0 | 5.3 |
| 23. | 10.0 | 1.5 | 11.5 | 3.4 | 51. | 10.0 | 3.0 | 10.0 | 23.6 |
| 24. | 10.0 | 1.5 | 13.0 | 75.0 | 52. | 10.0 | 3.0 | 12.0 | 76.9 |
| 25. | 10.0 | 1.5 | 13.0 | 97.4 | 53. | 10.0 | 3.0 | 13.0 | 92.3 |
| 26. | — | 1.5 | 13.0 | 12.0 | 54. | 3.0 | 3.0 | 16.0 | 66.7 |
| 27. | 1.0 | 1.5 | 13.0 | 12.0 | 55. | 10.0 | 3.0 | 16.0 | 98.7 |
| 28. | 4.0 | 1.5 | 15.0 | 1.0 | 56. | 10.0 | 3.1 | 10.0 | 12.0 |

TABLE 2

% Stucco vs. Time (Constant Pressure)

| TIME (HR) | AVERAGE STUCCO PRODUCED (%) | PRESSURE (PSIG) |
|---|---|---|
| 1.0 | 1.4 | 5.0 |
| 1.1 | 3.6 | 5.0 |
| 2.0 | 0.3 | 5.0 |
| 3.0 | 7.8 | 5.0 |
| 0.1 | 0.9 | 10.0 |
| 1.0 | 9.1 | 10.0 |
| 1.5 | 13.0 | 10.0 |
| 2.0 | 21.6 | 10.0 |
| 3.0 | 18.3 | 10.0 |
| 1.0 | 1.0 | 11.5 |
| 1.5 | 3.4 | 11.5 |
| 2.0 | 16.3 | 11.5 |
| 0.8 | 65.0 | 12.0 |
| 1.0 | 44.0 | 12.0 |
| 3.0 | 76.9 | 12.0 |
| 1.0 | 4.3 | 13.0 |
| 1.5 | 54.1 | 13.0 |
| 2.0 | 88.9 | 13.0 |
| 3.0 | 92.3 | 13.0 |
| 2.0 | 85.0 | 14.0 |
| 1.0 | 25.0 | 15.0 |
| 1.5 | 18.0 | 15.0 |
| 0.3 | 19.0 | 16.0 |
| 0.5 | 7.5 | 16.0 |
| 1.0 | 95.1 | 16.0 |
| 1.5 | 66.0 | 16.0 |
| 2.0 | 94.0 | 16.0 |

TABLE 3

% Stucco vs. Pressure (Constant Time)

| PRESSURE (PSIG) | AVERAGE STUCCO PRODUCED (%) | TIME (HR) |
|---|---|---|
| 5.0 | 1.4 | 1.0 |
| 10.0 | 9.1 | 1.0 |
| 13.0 | 4.3 | 1.0 |
| 16.0 | 92.6 | 1.0 |
| 5.0 | 0.3 | 2.0 |
| 10.0 | 21.3 | 2.0 |
| 13.0 | 88.9 | 2.0 |
| 16.0 | 98.0 | 2.0 |
| 5.0 | 5.3 | 3.0 |
| 10.0 | 23.6 | 3.0 |
| 13.0 | 92.3 | 3.0 |
| 16.0 | 98.7 | 3.0 |

EXAMPLE 2

This example illustrates the autoclaving of landplaster to stucco fibers at pressures of 60, 125 and 180 psig.

For each run, 8 lbs. of ground landplaster (>90% through a 100 mesh screen) were placed in a sample holder, water was added to the 5 gal. mark, and the sample holder was then placed inside a cylindrical reactor having dimensions of 18" in diameter by 24" long.

After the reactor was sealed, a stirring device running the length of the reactor was activated and the pressure was brought up to the desired level. The slurry quickly came to a temperature of 121° C. for each run, indicating excellent heat transfer in the reactor. The point when the temperature of the slurry rose to 121° C. was taken as time=0:00. Samples of the slurry were taken during the course of the landplaster to stucco conversion by a 174 " sampling line placed into the slurry. The times at which the samples were taken are shown in the following table.

The samples taken were filtered and immediately washed with acetone for removal of water to prevent rehydration of the stucco. The samples were then dried in an oven at 50° C. Analysis of the samples for % fibrous stucco gave the results shown in the following Table 4:

TABLE 4

PERCENT STUCCO AT ELEVATED PRESSURE

A. 60 PSIG

| TIME (MIN) | SLURRY TEMPERATURE* (°C.) | SAMPLE NO. | % FIBROUS STUCCO |
|---|---|---|---|
| 0:00 | 111 | | |
| 5:00 | 123 | Sample 1 | 91.0 |
| 11:00 | 129 | Sample 2 | 89.3 |
| 20:00 | 127 | Sample 3 | 100.0 |
| 40:00 | 135 | Sample 4 | 99.5 |
| 60:00 | 135 | Sample 5 | 98.9 |

*Preheat time for slurry to reach 111° C. = 6:00 min
Conversion measured at this point = 95.7% fibrous stucco

B. 125 PSIG

| TIME (MIN) | SLURRY TEMPERATURE* (°C.) | SAMPLE NO. | % FIBROUS STUCCO |
|---|---|---|---|
| 0:00 | 111 | | |
| 2:00 | 132 | | |
| 5:00 | 149 | Sample 1 | 96.7 |
| 10:00 | 168 | Sample 2 | 95.3 |
| 20:00 | 168 | Sample 3 | 94.4 |
| 40:00 | 166 | Sample 4 | 91.3 |
| 60:00 | 166 | Sample 5 | 88.2 |

*Preheat time for slurry to reach 111° C. = 2:30 min.
Conversion measured at this point = 93.2% fibrous stucco

B. 180 PSIG

| TIME (MIN) | SLURRY TEMPERATURE* (°C.) | SAMPLE NO. | % FIBROUS STUCCO |
|---|---|---|---|
| 0:00 | 129 | — | |
| 6:00 | 131 | Sample 1 | 99.3 |
| 12:00 | 135 | Sample 2 | 99.4 |
| 17:40 | 143 | — | |
| 22:00 | 152 | Sample 3 | 99.4 |
| 29:00 | 160 | — | |
| 35:00 | 166 | Sample 4 | 90.8 |
| 40:00 | 168 | — | |

TABLE 4-continued

PERCENT STUCCO AT ELEVATED PRESSURE

| 55:00 | 168 | Sample 5 | 97.6 |

*Preheat time for slurry to reach 111° C. = 2:30 min.
Conversion measured at this point = 97.3% fibrous stucco

EXAMPLE 3

This example illustrates the use of fibrous stucco (α-hemihydrate) in the production of gypsum boards.

A. PRODUCTION OF FIBROUS STUCCO

Fibrous stucco was prepared in a series of calcinations from the same landplaster and in the same autoclave as in Example 1. In each calcination, a dilute slurry containing up to 1000 g of the ground landplaster in 6000 cc water was stirred in the sealed and heated autoclave whose bottom again contained vigorously boiling water. The pressure was brought to 15–16 pgig and the calcination was conducted for 1½ hours. After the reaction, the autoclave was quenched by cold water, the pressure brought to atmospheric pressure, and the reactor opened. The wet fibrous mass produced had a significantly increased bulk volume and was somewhat agglomerated with the consistency of oatmeal. The excess water of the reaction mixture was removed by suction filtration.

The percentage conversion of landplaster to stucco was checked by placing a small sample of the wet fibrous mass in acetone, filtering it immediately and drying the sample at 50° C. to displace the free water. The weight loss was the free water content of the wet fibers. The dried sample was then calcined at 177° C. to remove all chemically bound water. By knowing the purity of the landplaster and the weight percent lost, the percent stucco was determined as explained in Example 1.

The remainder of the filter cake was weighed and then mixed with ordinary calcined gypsum (standard stucco) and water to produce gypsum boards, as described below. Subtraction of the free water content gave the actual weight of fibers used in the board manufacture.

B. PRODUCTION OF GYPSUM BOARDS

Gypsum board samples were prepared utilizing the formulations set forth in Table 5 below. The standard stucco, wet fibrous stucco and water were mixed in a Waring blender for 20 seconds. The mix was poured into 2"×2"×2" and 3"×12"×0.5" molds. The top of the samples in the molds were then leveled. They were allowed to set, demolded after 45 minutes, dried 24 hours at 50° C., and tested. Results of the testing are shown in the following Table 5. No paper facers were used for the samples.

TABLE 5

GYPSUM BOARDS

| | FORMULATION | | | PROPERTIES | | |
|---|---|---|---|---|---|---|
| RUN NO. | STANDARD STUCCO (g) | STUCCO FIBERS (q) | WATER (q) | DENSITY (PCF) | MOR (PSI) | COMPRESSIVE STRENGTH (PSI) |
| 1. | 935 | 15 | 800 | 61.4 | 530 | 1034 |
| 2. | 955 | 45 | 889 | 54 | 439 | 743 |
| 3. | 950 | 45 | 889 | 54 | 439 | 743 |
| 4. | 950 | 53 | 953 | 55.2 | 386 | 753 |
| 5. | 900 | 86 | 1004 | 50.9 | 349 | 569 |
| 6. | 900 | 100 | 1171 | 45.8 | 252 | 449 |
| 7. | 525 | 136 | 1400 | 29.4 | 51.4 | 74 |
| 8. | 800 | 200 | 885 | 46 | 243 | 359 |
| 9. | 794 | 206 | 1400 | 29.4 | 51.4 | 74 |

TABLE 5-continued

GYPSUM BOARDS

| | FORMULATION | | | PROPERTIES | |
|---|---|---|---|---|---|
| RUN NO. | STANDARD STUCCO (g) | STUCCO FIBERS (q) | WATER (q) | DENSITY (PCF) | MOR (PSI) | COMPRESSIVE STRENGTH (PSI) |
| 10. | 525 | 271 | 1264 | 30 | 83.8 | 99 |
| 11. | 660 | 340 | 1264 | 30 | 84 | 99 |
| 12. | 525 | 417 | 1800 | 30.1 | 75.7 | 88 |
| 13. | 504 | 496 | 1800 | 30.1 | 76 | 88 |
| 14. | 100 | 763 | 3531 | 16.3 | 5.1 | 8 |
| 15. | 111 | 889 | 3531 | 16.3 | 5 | 8 |

C. STATISTICAL ANALYSIS OF TEST DATA

Statistical analysis of the measured physical properties shown in Table 4 generated the following predictive equations correlating for a gypsum product of the invention the % fibrous stucco content and the density of flexural and compressive strengths.

1. Statistical analysis of the data of Table 4 showed an excellent correlation coefficient of 98% for the relation of percent fibrous stucco to the board density. The predictive equation generated for the data was:

Density (pcf) = 54.0 − 0.42 (% Stucco Fiber)

Using the relationship, Table 6 below shows predicted board densities over the range studied.

TABLE 6

| Fibrous Stucco (%) | Predicted Density (pcf) | Reduction from Standard Board* Density (%) |
|---|---|---|
| 0 | 54.0 | 0 (standard) |
| 10 | 49.8 | −7.8 |
| 30 | 41.4 | −23.3 |
| 50 | 33.0 | −38.9 |
| 70 | 24.6 | −54.4 |
| 90 | 16.2 | −70.0 |

*100% standard stucco used in board manufacture.

As a check on the equation, 100% standard stucco and water were processed identically to the fibrous stucco/ standard stucco mixtures to yield standard board samples. The standard stucco was prepared by conventional kettle calcination at atmospheric pressure of ground landplaster having the same composition as that used in making the fibrous stucco. The 18 standard board samples produced gave an average density of 53.2 versus the predicted 54.0 pcf. Also, a board sample made from 100% fibrous stucco had a density of 12-13 pcf versus the predicted value of 12.0.

This work shows that a gypsum board of a specific density can be produced in accordance with the present invention by simply employing in its makeup the % fibrous stucco corresponding to that density.

2. The flexural strength (MOR) data showed a 93% correlation coefficient for the effect of % fibrous stucco on the board MOR. The predictive equation generated from the data was:

MOR (psi) = 17.3 + 1988/(% Stucco Fiber)

Using this relationship, the following Table 7 was developed for predicted flexural strengths over the range of fibrous stucco-containing boards studied.

TABLE 7

| Fibrous Stucco (%) | Predicted MOR (psi) | Reduction from Standard Board* MOR (%) |
|---|---|---|
| 0 | 259 | 0 (standard) |
| 10 | 216 | −16 |
| 30 | 84 | −55 |

TABLE 7-continued

| Fibrous Stucco (%) | Predicted MOR (psi) | Reduction from Standard Board* MOR (%) |
|---|---|---|
| 50 | 57 | −78 |
| 70 | 46 | −82 |
| 90 | 40 | −85 |

*100% standard stucco used in board manufacture.

Testing of the board samples made from standard stucco gave an average MOR value of 259 psi.

While the MOR and density of the inventive gypsum boards decrease as the percent fibrous stucco used in making them increases, the ultimate flexural strength of standard gypsum boards is heavily dependent on their two paper facers. As an example, board samples made from standard stucco were tested with and without facers. The MOR increased 260% from 259 psi to 680 psi with the addition of the paper facers (i.e., 62% of the MOR was due to the paper). Therefore, the gypsum boards of the invention can be constructed with paper facers as well as other reinforcers to advantageously provide low density products which still possess an acceptable strength 3. The compressive strength of the 2"×2"×2" cubes produced with varying amounts of the fibrous stucco decreased with increasing fibers and had a 91% correlation coefficient for the data. The predictive equation generated was:

Compressive Strength (psi) = −4.7 + 3649/(% Stucco Fiber)

Using this relationship, the following Table 8 was generated to show predicted compressive strengths over the range of boards studied.

TABLE 8

| Fibrous Stucco (%) | Predicted Compressive Strength (psi) | Reduction from Standard Board* Compressive Strength (%) |
|---|---|---|
| 0 | 666 | 0 (standard) |
| 10 | 360 | −46 |
| 30 | 117 | −82 |
| 50 | 68 | −90 |
| 70 | 47 | −93 |
| 90 | 36 | −95 |

*100% standard stucco used in board manufacture.

The standard board samples tested had an average compressive strength of 666 psi. The reductions in compressive strength with decreasing density follow the usual pattern wherein most materials are adversely affected as their density drops.

4. To determine the consistency of the mixtures of fibrous stucco and standard stucco, it was necessary to first dry the fibers and calcine them because of the variability of water contents of the wet fibers. It was found that the consistency increased with increasing fibrous stucco content according to the following equation:

Consistency (cc H$_2$O/100 g) = 67.96 + 0.464 (% Stucco Fiber)

INSULATING PROPERTIES OF GYPSUM BOARDS

The insulating properties were measured for gypsum board samples produced at various densities. K-factors were determined on samples with nominal thicknesses of 0.5" by means of Anacon heat-flow meters at a 75° F. mean temperature. Significant increases in the insulating properties were realized as the density decreased. The k-factors found are shown in the following Table 9.

TABLE 9

| Density (pcf) | K-Factor (Btu · in/hr · ft$^2$ · °F.) |
|---|---|
| 16 | .504 |
| 19.5 | .610 |
| 29 | .736 |
| 48 | .890 |
| 70 | 1.257 |

EXAMPLE 4

This example illustrates the production of paper faced gypsum boards containing (a) mixtures of standard stucco and fibrous stucco and (b) only standard stucco (control board).

The three formulations utilized for making the core of the boards are as follows:

| | PARTS BY WEIGHT | | |
|---|---|---|---|
| BOARD | A | B | C |
| Standard Stucco | 1200 | 1164 | 1128 |
| Stucco Fibers | 0 | 36 | 72 |
| Starch | 6 | 6 | 6 |
| Accelerator | 3.7 | 3.7 | 3.7 |

The above solid ingredients were combined with water in amount 0.8 times by weight the weight of the solids to obtain a slurry, which was the cast on a paper sheet and spread to a uniform thickness. The slurry was covered by another paper sheet, press molded and thereafter dried. The time to set and other physical properties of the resulting gypsum boards are shown in the following Table 10.

TABLE 10

| PROPERTIES | A[1] CONTROL | B[2] 3% FIBER | C[3] 6% FIBER |
|---|---|---|---|
| Time to Final Set | 8:30 | 8:40 | 8:50 |
| lb/1000 ft$^2$ | 1906 | 1846 | 1843 |
| % Weight Decrease | NA | 3.14 | 3.30 |
| Flexural Strength (PSI) | 1547 | 1754 | 1807 |
| Humid Bond (%) | 100 | 100 | 100 |
| Compressive Strength (PSI) | 412 | 416 | 397 |

[1]Control Board
[2]Board containing 3% fibrous stucco.
[3]Board containing 6% fibrous stucco.

As shown in Table 10, board weight reductions are achieved by replacing standard stucco with stucco fibers. While the replacement causes an increase in the time to final set, this should be remediable by use of additional accelerator. The data in the table reveal that the decrease in board density brought about by use of the fibrous stucco is not accompanied by an diminution in physical properties.

The process of the invention accordingly can provide lightweight and easy-to-handle gypsum boards suitable as standard structures and inorganic boards.

I claim:

1. A gypsum board comprising a mineral core having two major, substantially parallel surfaces and a facing material on at least one of the major surfaces of the core, the core being the dried rehydrated product of the following formulation:

| | WEIGHT PERCENT |
|---|---|
| Standard Calcined Gypsum | 50-99 |
| Fibrous Calcium Sulfate Hemihydrate | 1-50 |
| Bond Protecting Agent | 0-5 |
| Fibrous Reinforcer | 0-10 |
| Accelerator | 0-2 |
| Foaming Agent | 0-.5 |

2. The gypsum board of claim 1 wherein facing materials are on both major surfaces of the core.

3. The gypsum board of claim 2 wherein the facing materials are paper.

4. A lightweight gypsum product comprising the dried rehydrated product of the following formulation:

| | WEIGHT PERCENT |
|---|---|
| Standard Stucco | 1-50 |
| Fibrous Calcium Sulfate Hemihydrate | 99-50 |
| Fibrous Reinforcer | 0-10 |
| Paper Fiber | 0-2 |
| Fillers | 0-15 |
| Bond Protecting Agent | 0-3 |
| Accelerator | 0-2 |

* * * * *